US00H002130H

(19) United States
(12) Statutory Invention Registration
Fan

(10) Reg. No.: US H2130 H
(43) Published: Nov. 1, 2005

(54) LASER-DIFFERENCE-FREQUENCY DISCRIMINATOR

(75) Inventor: Tso Yee Fan, Belmont, MA (US)

(73) Assignee: The United States of America as represented by the Secretary of the Air Force, Washington, DC (US)

(21) Appl. No.: 10/699,382

(22) Filed: Nov. 3, 2003

(51) Int. Cl.[7] ..... G01S 15/00
(52) U.S. Cl. ..... 356/519; 250/227.23
(58) Field of Search ..... 356/519; 250/227.23

(56) References Cited

U.S. PATENT DOCUMENTS

2002/0080367 A1 * 6/2002 Asami ..... 356/519

* cited by examiner

*Primary Examiner*—Daniel Pihulic
(74) *Attorney, Agent, or Firm*—William G. Auton

(57) ABSTRACT

A laser difference frequency discriminator that detects the difference between two laser frequencies and outputs a voltage near baseband that is related to the difference frequency. This discriminator power splits a laser beam containing the two laser frequencies into two paths, one which is sent down a delay line to a photo detector while the other is sent directly to a photodiode; there may be an optional phase shifter in either path. The relative phases of the heterodyne signals from the photo detectors are compared in a phase detector, its output voltage is related to the phase difference, which is, in turn, related to the difference frequency. This discriminator has applications in microwave generation, laser radar, and optical communications.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LASER-DIFFERENCE-FREQUENCY DISCRIMINATOR

STATEMENT OF GOVERNMENT INTEREST

The invention described herein may be manufactured and used by or for the Government for governmental purposes without the payment of any royalty thereon.

FIELD OF THE INVENTION

This invention is related to laser frequency reference systems.

BACKGROUND OF THE INVENTION

In some laser applications, such as optical communications, laser radar, and microwave generation by heterodyning of lasers, it is necessary or desirable to be able to simply detect or measure the difference between two laser frequencies by, for example, generating an analog signal that is a measure of the frequency difference. There are several methods of measuring the difference between two lasers; here is described a laser-difference-frequency discriminator that measures the difference between two laser frequencies and outputs a voltage at baseband that is related to the difference frequency. The discriminator should be capable of measuring changes in the difference frequency at rates approaching a megahertz, but the use of this discriminator is limited to difference frequencies that are within a photo detector's bandwidth. The concept for the difference-frequency-discriminator is related to delay-line frequency discriminators that are often used in the microwave region, but instead of bulking microwave delay lines, we use optics to give the laser-difference-frequency discriminator advantages in tunability, performance and size relative to a microwave delay-line discriminator. Laser-difference-frequency discriminators can be used, in conjunction with a feedback loop, to stabilize laser difference frequencies in such applications as laser radar and microwave generation.

The task of providing a laser-frequency discriminator system is alleviated somewhat by the systems disclosed in the following U.S. patents, the disclosures of which are incorporated herein by reference:

U.S. Pat. No. 4,982,082 issued to Ottusch, entitled "Frequency Detector for discriminating multi-longitudinal mode laser operation".

U.S. Pat. No. 4,701,924 issued to Thomas, entitled "Frequency Discriminating Laser".

SUMMARY OF THE INVENTION

The present invention is a laser-frequency-delay-line discriminator that works optimally around discrete, fixed, frequency differences and a second discriminator in which the optimal frequency differences can be rapidly tuned.

In both cases, a laser beam with two laser frequencies $V_1$ and $V_2$ with a difference frequency of $fo$ is power split into two beams, one of which is sent down a delay line with delay $\tau_d$, typically obtained by sending the beam down an optical fiber, to a photo detector, and the other is sent directly to another photo detector. Each photo detector has an output at the difference frequency (FIG. 2) due to heterodyning (beating) of the two laser frequencies. The phase difference between the two photo detector outputs is detected by use of a phase detector, such as a double-balanced mixer. The output voltage of the phase detector is related to $fo$.

DETAILED DESCRIPTION OF THE PREFERRED EMBODIMENT

Figure 1:
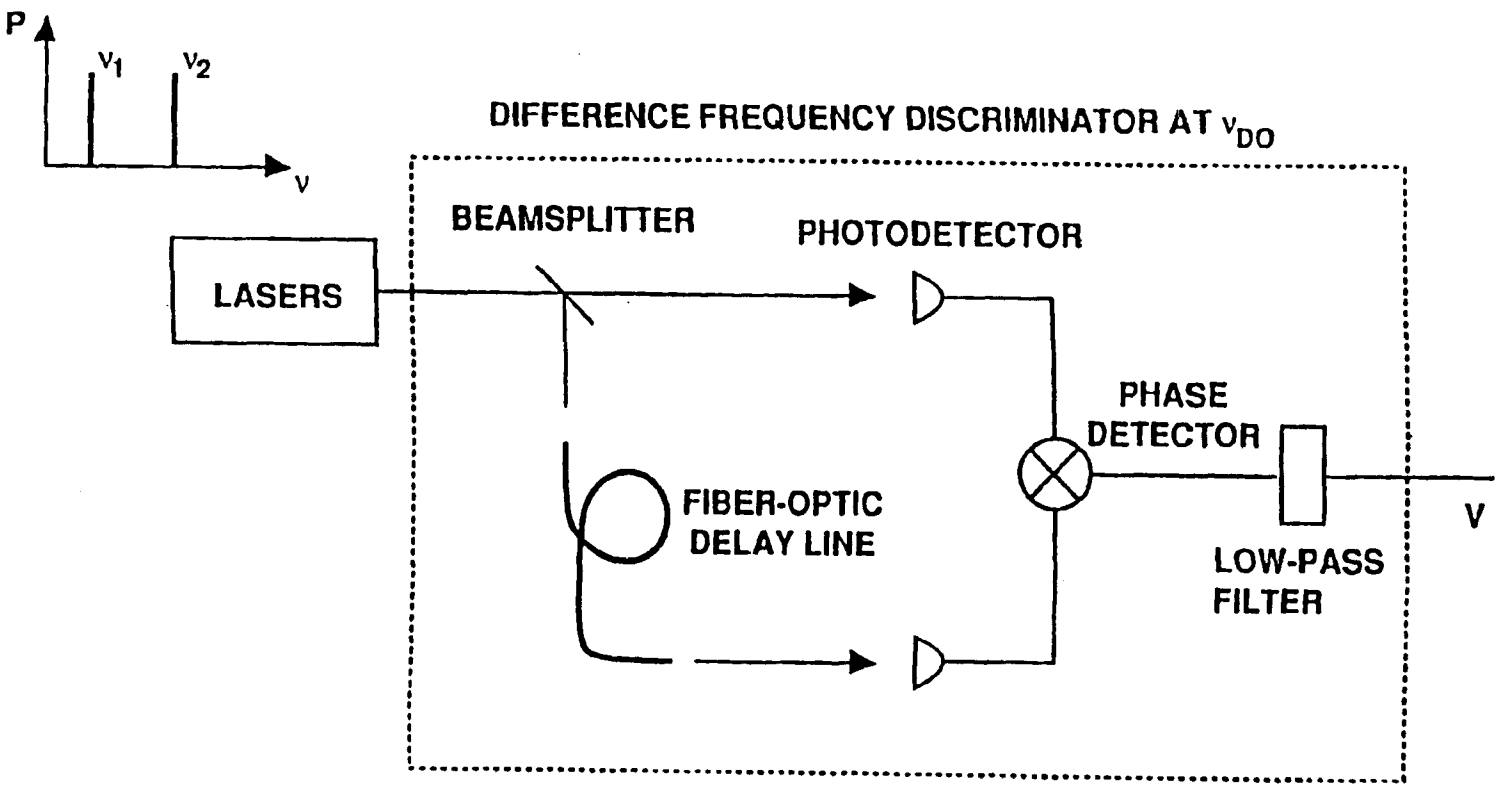
FIG. 1 Fixed difference-frequency discriminator.
Figure 2:
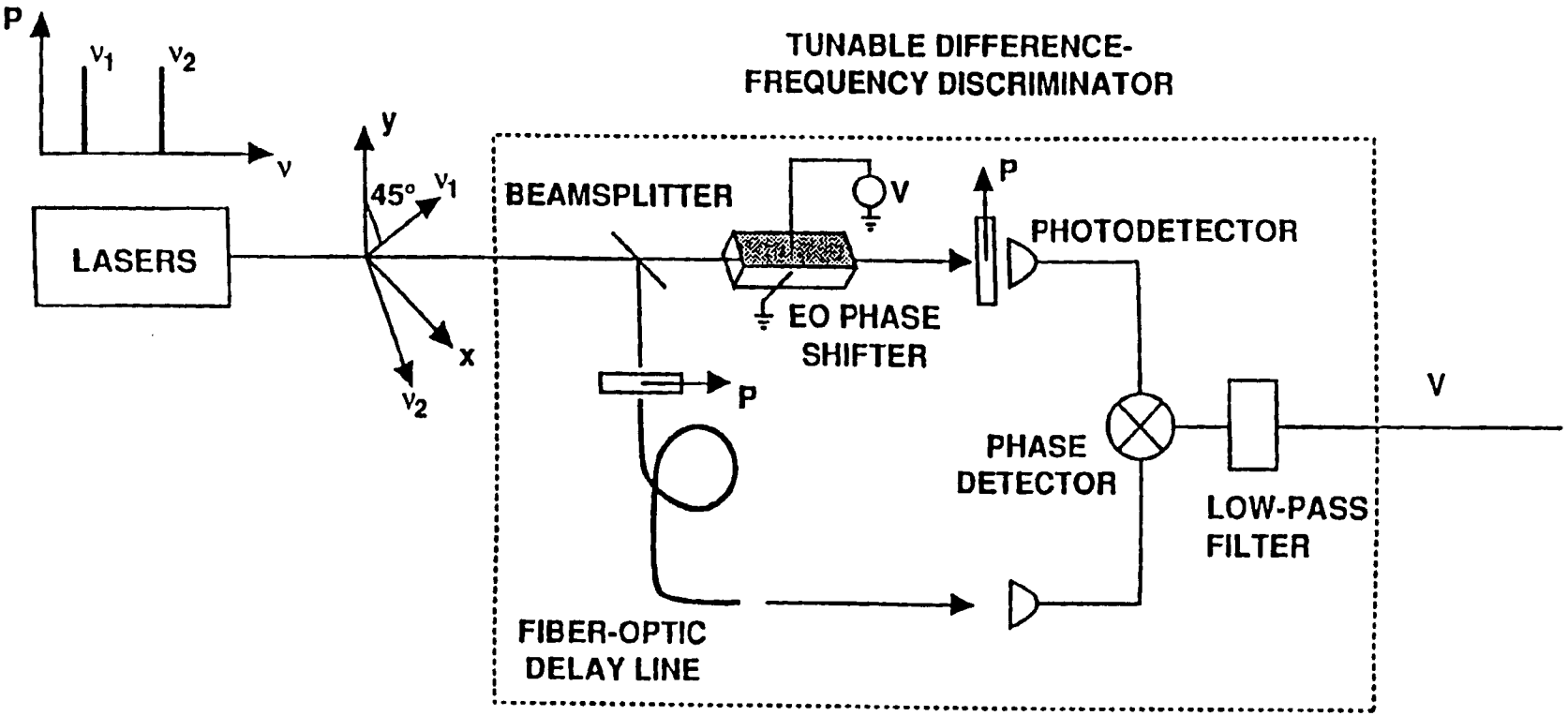
FIG. 2 Tunable difference-frequency discriminator.

Diagrams of laser difference-frequency delay-line discriminators are shown in FIGS. 1 and 2.

FIG. 1 shows a discriminator that works optimally around discrete, fixed, frequency differences and FIG. 2 shows a discriminator in which a discriminator in which the optimal frequency differences can be rapidly tuned.

In both cases, a laser beam with two laser frequencies $V_1$ and $V_2$ with a difference frequency of $fo$ is power split into two beams, one of which is sent down a delay line with delay $\tau_d$, typically obtained by sending the beam down an optical fiber, to a photo detector, and the other sent directly to another photo detector. Each photo detector has an output at the difference frequency (FIG. 2) due to heterodyning (beating) of the two laser frequencies. In the tunable version, the beam that is sent directly to a photo detector is shown passing through a variable phase shifter $\Delta\theta$, in principle, the variable phase shifter is to change the phase of one of the optical frequencies by $\Delta\theta$ relative to the other frequency. Polarizers are shown in FIG. 2, which are used to force the laser frequencies to be in the polarization states for highest heterodyne efficiency. The requirements on polarization will be discussed later.

The signals from the photo detectors are at the same frequency but have different phases where $\phi$ is relative phase of the signals. $\phi$ is detected in a phase detector that converts it into a baseband voltage V that is proportional to cos $\phi$ at baseband frequencies. The low-pass filter serves to eliminate high frequency components such as 2 $fo$ that can also be generated in a double-balanced mixer. Fluctuations in the laser difference frequency $\Delta f$ are converted to fluctuations in the relative phase $\Delta\theta$ at the phase detector by the delay line, and these phase fluctuations are then converted to voltage fluctuations $\Delta V$.

The difference-frequency discriminator has its highest sensitivity to fluctuations in the laser difference frequency if the relative phases from the two lines are in quadrature (i.e. the relative phase are $\pm\pi/2$) at the phase detector. $\phi$ as a function of $fo$ is given by:

$$\phi(t)=2\pi fo\tau_d-\Delta\theta \quad (1)$$

For the fixed difference-frequency discriminator, $\Delta\theta$ is 0. A double balanced mixer when operated as a phase detector has an output characteristic $$V(t) \sim V_o \cos\phi(t) \quad (2)$$

at baseband. Equation (2) in combination with eq. (1) shows that the voltage on the output of the phase detector is dependent on $f_o$. The voltage fluctuation caused by a phase fluctuation is given by $$\Delta V \sim \Delta\phi \sin\phi \quad (3)$$

and consequently, the discriminator has its highest sensitivity to frequency fluctuation when $\sin\phi = \pm 1$. This condition is given by $$\nu_{DO} = \frac{1}{2\pi\tau_d}[\Delta\theta \pm m\pi/2],\ m \text{ is odd integer.} \quad (4)$$

$\nu_{DO}$ are difference frequencies for which the relative phase at the detector are in quadrature and m is the order of the discriminator. Consequently, the fixed difference-frequency discriminator works optimally around a comb of frequencies $\nu_{DO}$ given by eq. (4) where $\Delta\theta=0$, and $f_o$ should be set equal to $\nu_{DO}$ for best performance. From eq. (4), it can be seen that the comb of frequencies for which the quadrature condition is satisfied in the fixed difference-frequency discriminator is actually only fixed to the extent $\tau_d$ is constant. Tuning can be obtained by changing $\tau_d$ but the rate of tuning will be limited in this approach. In a tunable difference-frequency discriminator, the comb of optimum frequencies can be tuned by varying $\Delta\theta$, which can be done much more rapidly (i.e. electro-optically) and easily than varying $\tau_d$. Rewriting eq. (3) under the assumption that the quadrature condition is satisfied leads to:

$$\Delta V \sim 2\pi\Delta f \tau_d \quad (5)$$

where $\Delta f$ is a fluctuation in the difference frequency from $\nu_{DO}$. In other words, the output voltage from the phase detector is proportional to the frequency fluctuation from $\nu_{DO}$ as long as $2\pi\Delta f\tau_d \ll \pi/2$.

The fixed and tunable difference-frequency discriminators impose different requirements on the polarization states of each frequency. In order to obtain high heterodyne efficiency, the polarization state of each frequency should be identical, i.e., parallel, at a given photo detector, although it is sufficient that the polarization states of the two frequencies be nonorthogonal to obtain a beat signal. In the fixed difference-frequency discriminator, the polarization states of the two frequencies entering the discriminator can be arbitrary as long as the polarizations are nonorthogonal at the photo detectors, but the optimum input polarization states of the two frequencies should be orthogonal and linear in the phase shifter if electro-optic crystals are used for that function. Consequently, in FIG. 2, the input polarizations are shown to be orthogonal and linear. Additionally, it is desirable to have the two frequencies in the same polarization in the fiber-optic delay line because drifts due to temperature-induced changes or bending-induced changes in the fiber birefringence are minimized.

The electro-optic phase shifter allows voltage tuning of the discriminator, and is usable over difference frequencies that span the entire microwave band. The relative optical phase shift of the two polarizations, which is equal to the phase shift in the beat frequency, induced by the phase shifter is $$\Delta\theta = (L/d)\pi n^3 r_{33} V_s/\lambda$$

assuming a transverse electrode geometry in $LiNbO_3$ or $LiTaO_3$. Here $r_{33}$ is the linear electro-optic tensor element of the crystal, $V_s$ is the applied voltage, n is the index of the refraction, $\lambda$ is the optical wavelength, L is the crystal length and d is the distance between electrodes. For a $LiNbO_3$ bulk phase shifter using the $r_{33}$ tensor element, assuming a wavelength of 1 $\mu$m and phase shifter dimensions of L=2 cm. and d=0.1 cm, approximately ±150 V is required to shift the phase $\pm\pi$, which allows the discriminator to be tuned across an order in the discriminator. The frequency tuning attained by shifting the net phase by $2\pi$, which is the interorder spacing, is given by $1/(2\tau_d)$, i.e., 10 MHz for a 50 ns delay. For an intergrated optic phase shifter, only a few volts would be required for the same phase shifter.

Laser-difference-freguency stabilization

The laser difference frequency delay-line discriminator can be used for stabilization of two laser frequencies relative to each other by deriving an error signal from the discriminator that drives a feedback loop to adjust the laser difference frequency. Stabilization is of interest for applications such as microwave generation by heterodyning two lasers and for coherent laser radar. The use of heterodyning of two optical frequencies to generate microwave signals is not new. The difficulty is that stabilization of the two optical frequencies with respect to each other is required since small fractional drifts in the optical frequency lead to large changes in the beat frequency. Two single-frequency lasers have been heterodyned and the beat signal phase locked to a microwave source with microwave tuning over a large frequency band. This stabilization technique requires a microwave source to achieve good heterodyne beat frequency stability. In addition, the phase noise of the heterodyned output will be no better than the phase noise of the microwave source over the phase locking bandwidth, and the tuning rates and modulation frequencies will also be limited by the microwave source. A laser difference-frequency discriminator would free a heterodyned signal generator from the need to have a microwave source for stabilization and may provide improved performance in the areas of phase noise, modulation frequencies, and frequency agility.

Figure 3:
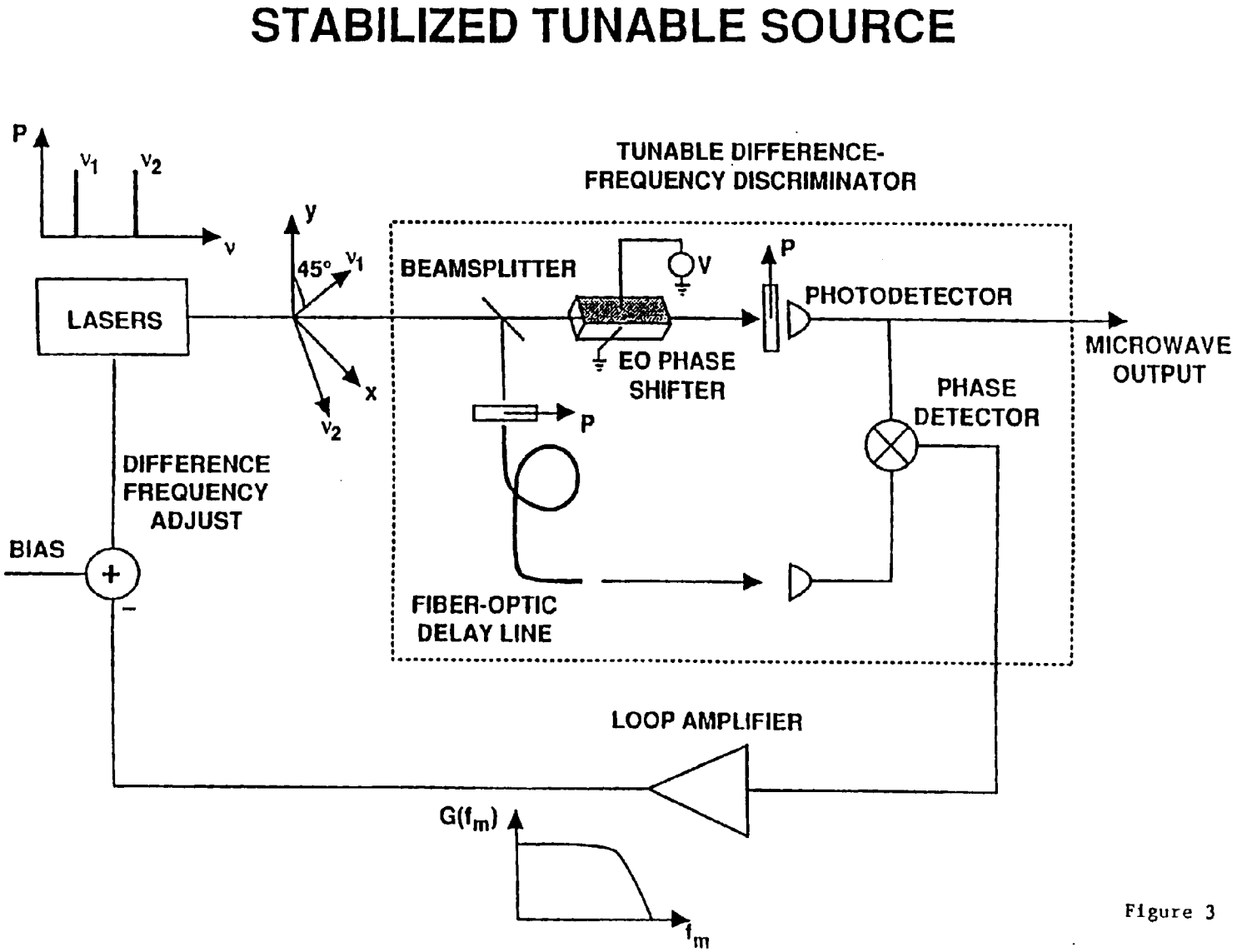
FIG. 3 Frequency stabilized microwave signal generation by heterodyning two lasers in conjunction with a feedback loop that uses a difference frequency discriminator to generate an error signal.

A schematic of a heterodyne microwave source stabilized with a laser difference-frequency discriminator is shown in FIG. 3. The output voltage from the phase detector is used as an error signal and is fed back through a loop amplifier to a laser difference-frequency adjust, which can be a frequency adjustment of a single frequency laser if two single-frequency lasers are used to generate the microwave signal. A low-pass filter is not explicitly shown in FIG. 3 because its function is incorporated into the loop amplifier, which is shown with a gain that rolls off at high frequencies.

In summary, the invention is a laser difference-frequency discriminator that detects the difference between two laser frequencies and outputs a voltage near baseband that is related to the difference frequency. This discriminator power splits a laser beam containing the two laser frequencies into two paths, one which is sent down a delay line to a photo detector while the other is sent directly to a photodiode;

there may be an optional phase shifter in either path. The relative phases of the heterodyne signals from the photo detectors are compared in a phase detector; its output voltage is related to the phase difference, which in turn is related to the difference frequency. This discriminator has applications in microwave generation, laser radar and optical communications.

While the invention has been described in its presently preferred embodiment, it is understood that the words which have been used as words of description rather than words of limitation and that changes within the purview of the appended claims may be made without departing from the scope and spirit of the invention in its broader aspects.

What is claimed is:

1. A laser frequency discriminator that detects a difference between two laser frequencies to produce, said first and second paths having respectively a first and second optical length, said first and second optical length being different optical lengths in value, thereby a difference output signal and which comprises:

a means for splitting an input laser beam with two frequencies into a first and second path; a photo detector which is on the first path and produces a detection output signal by processing signals therefrom;

a photodiode which is on the second path and which produces a photodiode output signal by processing signals therefrom;

a phase detector which compares phases of the photodiode output signal with the detection output signal to produce thereby the difference output signal.

2. A laser frequency discriminator, as defined in claim 1, wherein said first and second optical paths respectively comprise a first and second optical fiber which have different lengths.

* * * * *